INVENTOR.
Norman E. Thayer
John R. Judkins
BY Lockwood, Woodard,
Smith & Welkart
ATTORNEYS Sept. 14, 1965  N. E. THAYER ETAL  3,206,756
RECORDING INSTRUMENT
Filed July 27, 1962  4 Sheets-Sheet 3

INVENTOR.
Norman E. Thayer
John R. Judkins
BY Lockwood, Woodard,
Smith & Weikart
ATTORNEYS Sept. 14, 1965    N. E. THAYER ETAL    3,206,756
RECORDING INSTRUMENT Filed July 27, 1962    4 Sheets-Sheet 4

INVENTOR.
Norman E. Thayer
John R. Judkins
BY Rockwood, Woodard,
Smith & Weikart
ATTORNEYS

United States Patent Office 3,206,756
Patented Sept. 14, 1965

3,206,756
RECORDING INSTRUMENT
Norman E. Thayer and John R. Judkins, Indianapolis, Ind., assignors to Esterline-Angus Instrument Company, Inc., Indianapolis, Ind., a corporation of Delaware
Filed July 27, 1962, Ser. No. 212,894
9 Claims. (Cl. 346—112)

This invention relates generally to chart recording instruments and more particularly to improved writing means including improved means for converting the rotary motion of a galvanometer into straight line translational motion of a writing instrument.

In chart recording instruments of the type employing chart paper advanced linearly, it is desirable to produce straight line motion of the marking device at right angles to the direction of travel of the paper. It is also desirable that where the instrument is driven by the response of a galvanometer to an input signal, the length of the marks produced be proportional to the angular rotation of the galvanometer shaft.

Heretofore, mechanisms which have been employed in attempts to achieve the above result have been quite fragile and would not stand shocks, without damage. Moreover, the writing pen has been difficult to remove and service in general has been difficult.

It is, therefore, a general object of the present invention to provide an improved recording instrument.

It is a further object to provide means for converting a rotary motion into a rectilinear motion in a recording instrument.

It is a further object to provide means whereby the rotary motion of a galvanometer is converted to rectilinear motion of a marking element and wherein the extent of motion of the marking element is proportional to the extent of rotation of the galvanometer.

It is a further object to provide a recording instrument with an improved marking fluid supply system.

It is a still further object to provide means for achieving the foregoing objects, which means are also durable in construction and easily adjusted and maintained.

Described briefly, a typical embodiment of the present invention includes an instrument case or frame with a galvanometer therein. A driving arm is secured to the galvanometer shaft. A stationary drum is mounted with its outer cylindrical surface coaxial with the axis of rotation of the galvanometer shaft. A second drum or pulley is mounted on the driving arm for rotation thereon about an axis parallel to the galvanometer shaft axis. A writing unit is mounted on the rotatable pulley and a belt is provided connecting the two pulleys. Thus, turning of the driving arm by the galvanometer causes rotation of the second pulley on the driving arm resulting in motion of the writing unit.

The pulley diameters and the distances between the writing point and the second pulley as well as the distance between the second pulley axis and the shaft axis are selected whereby rotation of the galvanometer shaft produces straight line motion of the writing point in a degree proportional to the degree of rotation of the shaft.

The writing fluid supply means and the mounting of the writing unit to the rotatable pulley are such that they can be removed bodily from the instrument for cleaning, without the need for tools.

The full nature of the invention will be understood from the accompanying drawings and the following description and claims.

Figure 1:
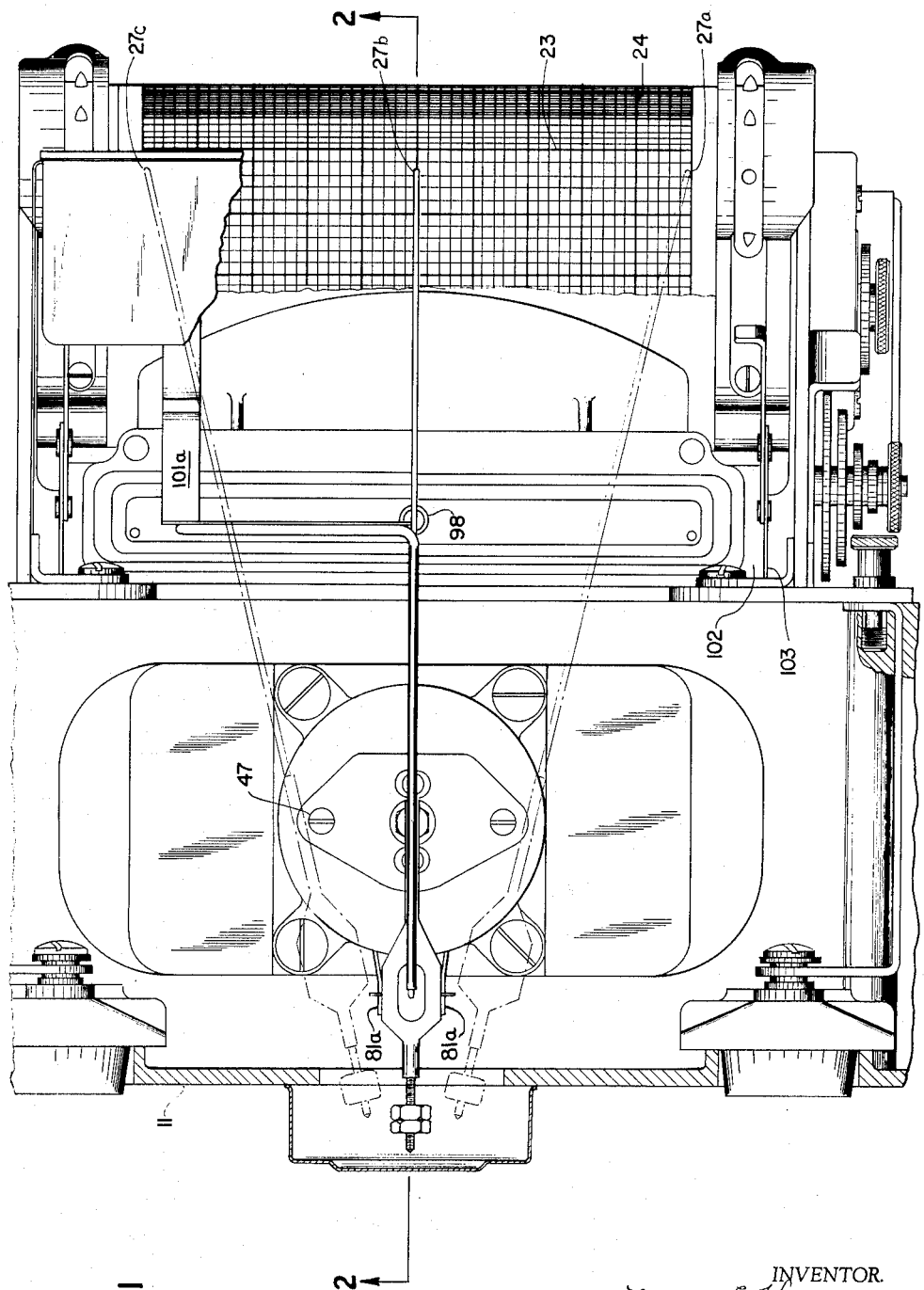
FIG. 1 is a top plan view, largely a schematic form, of a recorder employing a typical embodiment of the present invention.

Referring to the drawings, the recorder has a frame 11 to which is mounted the galvanometer 12, with the moving coil thereof mounted for rotation on the axis 14.

A continuous sheet of chart paper 16 or other suitable mark receiving medium extends from a supply spool (not shown) upwardly around rollers 17 and 18 and along the support plate 19 and around drive roller 21 down to a receiving spool (not shown). The projections 22 in the roller 21 engage apertures in the chart paper to provide for a precision drive of the paper. Roller 21 may be driven by an electric clock mechanism (not shown), for example. The paper 16 is provided with transverse lines 23 designating units of measurement such as, for example, time. Longitudinal marks 24 are provided which may be used to designate measurements of a phenomenon to be recorded by the recorder.

A pen arm 26 is provided and includes a marking tip 27 at its forward end which rests on the upper surface of the paper 16 at a point above the axis of roller 21. The marking tip is shown in FIG. 1 in three positions, 27a indicating a zero position, 27b indicating a mid-scale position and 27c indicating a full-scale position. It should be understood that the present invention is not limited to left-hand zero operation. Center zero or right-hand zero is possible merely by shifting the zero lever.

In order to facilitate the understanding of the pen mounting means and motion translating mechanism of the present invention, it is well to start with the galvanometer of the recorder. The galvanometer is of the type well known in the art incorporating a permanent magnet and a moving coil. The coil form 31 may be supported at the lower end in a manner well known in the art and which may be represented schematically by the shaft 32 secured to the coil form and having a pointed end supported in the end stone 33. The end stone or jewel 33 is secured in the adjustment screw 34 which is in turn mounted in the support ring 36. The support ring 36 is received in the aperture 37 in the plate 38 which is secured to the frame of the recorder. Ring 36 can be turned in the plate 38 and a spring 39 secured to plate 38 and bearing on the flange 41 provides sufficient friction between the underside of the upper flange of the ring and the upper surface of the plate 38 to prevent turning of the ring by any means other than operation of the zero lever 42. The zero lever shaft 43 has a pin 44 at the upper end thereof which is received in the slot 46 in the ring 36 whereby the ring can be turned by the shifting of the zero lever.

Figure 2:
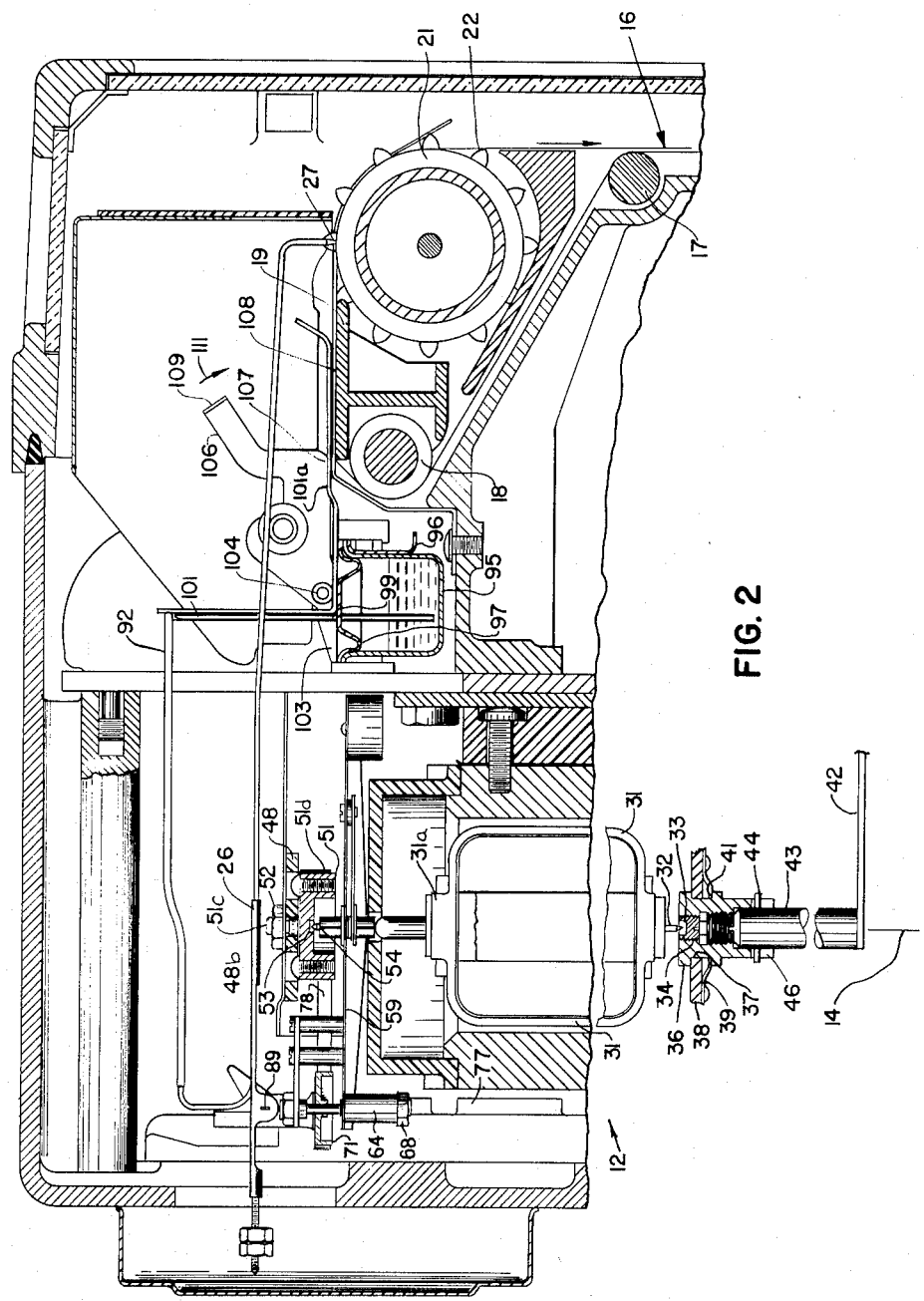
FIG. 2 is an enlarged fragmentary section through the recorder taken along the line 2—2 of FIG. 1.
Figure 3:
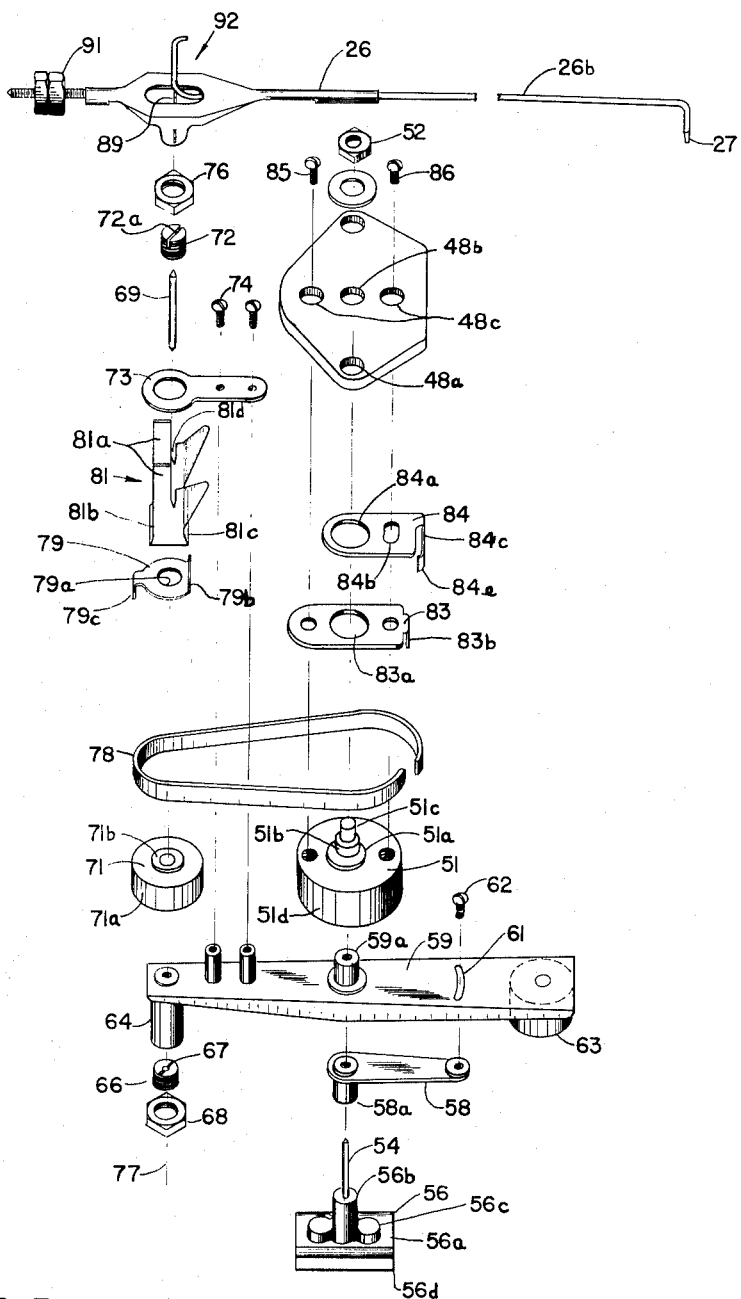
FIG. 3 is an exploded view showing details of parts of the motion translating means.
Figure 4:
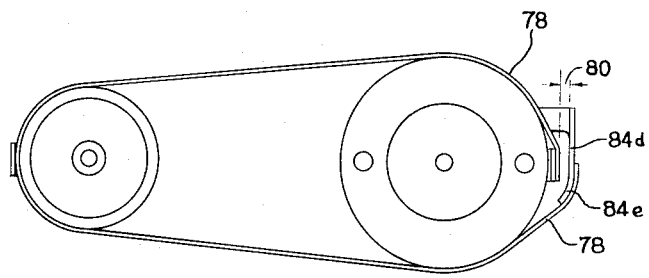
FIG. 4 is a fragmentary bottom view of the pulley and band arrangement.
Figure 5:
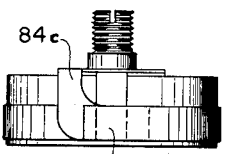
FIG. 5 is an end view of the pulley and band arrangement illustrating certain details of the band adjustment tabs.

Referring now to the regions above the galvanometer in FIG. 2, a bridge 48 is secured to the frame of the recorder. This is accomplished by means of screws 47 through apertures 48a (FIG. 3) in the bridge, which screws are secured to the frame of the recorder. Thus the bridge 48 is stationary.

A drum or pulley 51 having bosses 51a and 51b thereon has a threaded stem 51c atop the boss 51b. The boss 51b is fittingly received in the aperture 48b in the center of the bridge 48 and the pulley is secured in place by means of the nut 52. The upper face of the boss 51a abuts the lower face of the bridge 48 for a purpose which will become apparent as the description proceeds.

The pulley 51 has a jewel 53 centered therein with respect to the outer circumferential surface 51d of the pulley. This jewel receives and supports the pointed upper end of the galvanometer upper shaft 54. Thus it is seen that the galvanometer coil rotates about an axis 14 which is colinear with the axis of the outer cylindrical surface 51d of the drum 51.

At this point it may be appropriate to mention that the mounting of the galvanometer shafts to the coil form may typically be achieved by employing a shaft base member 56 of a material such as Bakelite, for example, having a groove 56a therein and a column 56b in which the shaft 54 is secured. A pair of bosses 56c may be provided at each side of the column to receive terminals for coil windings. The coil form 31 is provided with a pair of horizontally spaced upstanding tabs 31a between which the shaft base 56 is mounted. Subsequent to the mounting of the member 56, the tabs are bent over the ribs 56d defining the sides of the channel 56a. Thus the body 56 is keyed to the coil form, subsequent to which it may be covered with a Bakelite varnish and baked. Thus a rigid and permanent unit is formed.

Rotational motion of the galvanometer coil is transmitted to the translating mechanism of the present invention by means of a crank arm 58 having a split sleeve 58a secured thereto and tightly fitting the shaft 54. The crank arm is positively secured to the shaft by some suitable means such as soldering, for example.

A driving arm 59 is mounted on the shaft 54 by means of the split sleeve 59a which is secured to the arm and which, while it snugly fits the shaft 54, is not positively secured thereto. An arcuate slot 61 is provided in the arm 59 and the crank arm 58 is secured to the driving arm 59 by means of the screw 62. The provision of the arcuate slot and the screw 62 connecting the crank arm 58 with the driving arm, together with the provision of the split sleeve mounting the driving arm snugly though not rigidly to the shaft 54, facilitates rotation of the galvanometer coil with respect to the driving arm 59 upon loosening screw 62 whereby proper alignment can be obtained easily.

At the forward end of the driving arm 59 is a counterweight 63 which has the important function of preventing movement of the writing pen even though the recorder is tipped to the front or rear or from side to side. At the rear end of the arm 59, a lower bearing support cylinder 64 is secured. A screw 66 is threadedly received in the support 64 and has a bearing jewel 67 therein. The nut 68 is provided to lock the screw 66 in place once adjusted.

The bearing 67 supports the lower end of the pulley shaft 69 to which is press fitted the pulley 71, whose outer cylindrical surface 71a is centered on the shaft center. The upper end of the shaft is supported by the bearing screw 72 having a bearing jewel in the underside thereof (not shown) and threadedly received in the bracket 73 secured to the arm 59. The nut 76 is provided for locking the bearing screw 72 in place once adjustment has been achieved. A suitable slot 72a in the screw facilitates adjustment from the top.

At this point it will be apparent that rotation of the galvanometer coil is effective to rotate the arm 59 about the axis 14 while the pulley 51 remains stationary at all times. It will also be apparent that the pulley 71 is free to rotate on an axis 77 of the shaft 69. A belt 78 extends around the outer circumferential surfaces of both the drum 71 and the drum 51. The means of securing the belt to the drums will now be described.

A belt support tab member 79 is placed upon the flat upper face of the pulley 71, with the boss 71b of the pulley fitting the aperture 79a of the tab member and thereby centering the tab member on the pulley. A pen fork 81 having two upstanding fork portions 81a in horizontal spaced relation with a base portion 81b integral therewith and connecting them, is staked to the pulley 71 whereby tab member 79 is sandwiched between the pen fork base and the pulley 71. Typically, the pen fork is staked to the hub or boss 71b. A tab 79b of the support tab member is keyed to the front edge 81c of the pen fork whereby there can be no relative rotation between the parts. A downturned tab 79c of member 79 is soldered to the outside surface of the band 78. Accordingly, there can be no possibility of slippage of the belt with respect to the outside circumferential surface 71a of the drum 71.

To connect the band 78 to the stationary drum 51, the support tab member 83 is provided and is secured to the drum by the screws 85 and 86 passing through the apertures thereof and threadedly received in the drum 51. The aperture 83a in the tab member fits the circumference of the boss 51a whereby the tab is aligned with the drum. The tab member includes a down-turned tab 83b to which one end of the band is secured.

The other end of the band 78 is secured to a separate support tab member 84. Tab member 84 includes an aperture 84a which fits the boss 51a and has a slotted aperture 84b therein which receives the screw 86, which screw secures the tab members 83 and 84 to the drum. It should be noted that the sum of the thickness of the tab members 84 and 83 is slightly less than the height of the boss 51a. This will accommodate movement of the tab member 84 in a rotational sense about the axis 14 when the screw 86 is loosened. The rotational movement is possible to an extent within the limits provided by the slot 84b.

The tab member 84 includes a down-turned tab of an L-shape with the vertical leg of the L, 84c, joining the horizontal portion 84d well below the top of the drum 51. The end of the band which was not soldered to the tab member 83 is soldered to the remote end 84e of the horizontal leg 84d of the L. Thus it is seen that the band tension can be adjusted by merely loosening the screw 86 and rotating the tab member 84 slightly with respect to the stationary drum 51. The other end of the band need not be adjusted of course, inasmuch as the pulley 71 is free to turn on the arm 59.

It should also be understood that the apertures 48c in the bridge 48, which permit access to and passage of the screws 85 and 86, are comparatively large with respect to the screw heads. It should also be recognized that by virtue of the securement of one end of the band 78 to the remote end of the L-shaped tab portion, and providing a radial space 80 between this connection and the connection of the other end of the band to the tab member 83, sufficient flexibility is provided to prevent damage to the parts upon sudden application of force by the galvanometer and to relieve any stress which might otherwise develop in the parts with the passage of time. Yet sufficient rigidity is present to prevent slippage of the band on the pulley during normal usage of the machine.

By way of example, a material which has been found satisfactory for the belt 78, is a fifty percent silver-fifty percent palladium alloy. The pulleys are typically made of aluminum. The principal physical properties desired in the belt are corrosion resistance, stability under temperature extremes, a low coefficient of expansion and absence of a tendency to get brittle.

The pen includes the pen arm 26 and a horizontal knife edge member 89 supported in the notches 81d of the pen fork vertical supports. A screw and suitable nuts 91 are provided at the rear end of the pen arm for balancing purposes. The pen arm tube 26b is secured to the pen arm and the downturned forward end thereof has an outlet at the end to provide a marking tip or penpoint 27. The rear end of the ink tube is upstanding and is connected to the flexible ink supply tube 92. Neoprene has been found to be an excellent material for the ink tube 92.

In order to provide precise straight line movement of the pen point 27, the amount of which movement is proportional to the degree of rotation of the galvanometer shaft, and, therefore, to the current flowing through the galvanometer coil, a certain dimensional relationship must be provided between certain of the parts heretofore described. For reference purposes, the horizontal distance between the axis 14 and axis 77 will be given the reference character A. The horizontal distance between the axis 77 and the pen point 27 is given reference character B. The radius of the outer cylindrical surface of the stationary pulley 51 is given the reference character $R_1$. The radius of the outer cylindrical surface of the pulley 71 is given reference character $R_2$. It is understood, of course, that it is only necessary that the portion of the pulleys 71 and 51 which is engaged by the belt at any time during the operation of the recorder be cylindrical with respect to the drum axes. However, as a practical matter, it is most convenient to provide completely cylindrical members for both of the drums.

To obtain precise straight line operation, the above mentioned dimensions are determined according to the relationship $$.99\sqrt{A/B} = \frac{R_1}{R_2} - 1$$

Figure 6:
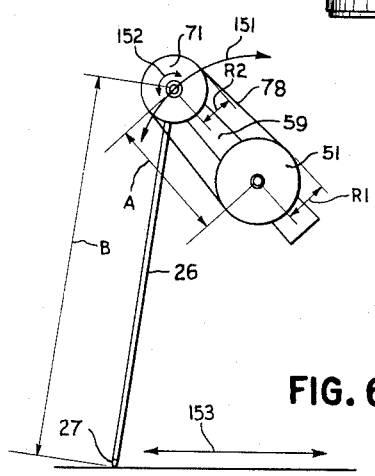
FIG. 6 is a schematic top plan view of the pulley, band, and lever arm arrangement, to facilitate an understanding of the operation of the invention.

In the operation of the instrument, a signal input to the galvanometer causes an angular movement of its shaft. Arm 59, being rotatable about the galvanometer shaft axis, as indicated by arrows 151 (FIG. 6), and being driven by the galvanometer, is therefore moved through the same angle as the galvanometer shaft. Because drum 51 is stationary and pulley 71 is rotatably mounted to arm 59, as indicated by arrows 152, the band 78 connected to the drum and pulley causes pulley 71 to rotate on the arm 59 as the arm is driven by the galvanometer. The pen arm, being connected to pulley 71, is driven directly thereby to trace a straight line at its point 27. The straight line motion of the point 27 is indicated by arrows 153 (FIG. 6).

To align the straight mark obtained, with the transverse lines of the chart, it is only necessary to loosen the nut 52 which locks the stem 51c of the stationary drum and rotate the drum slightly. The slight rotation can be easily accomplished by inserting a screw driver in the apertures 48c of the bridge 48 and bearing against a wall of the aperture and against one of the screws 85 or 86. Thus a very slight movement in rotation of the stationary drum can be obtained so long as the nut 52 is loose. This is all that is required to align the straight line produced by the recorder with the transverse lines of the chart. No further adjustment is ever required until the instrument is disassembled for some reason.

It can readily be recognized that by reason of the novel motion translating means of this invention, the pen can readily be completely removed from the means whereby it is driven. It is not only readily removed but also it is removable without tools. Recognizing the advantage of such facility of removal of the pen and also of the remaining ink supply elements to facilitate periodic cleaning, additional features of our invention are provided and will now be described.

An elongate ink reservoir 95 rests in a suitable ink well 96 in the frame of the recorder. A removable cover 97 is provided on the reservoir and has an aperture 98 therein for filling thereof and an aperture 99 therein through which passes a capillary riser tube 101 which is secured to the member 101a. At each side of the reservoir there is a flange 102 with an upstanding ear 103 to which is pivotally fastened at 104 a removing handle 106. Toward the free end of each handle is a heel portion 107 which rests on a plate 108 which is secured to the recorder frame. By simply pressing downwardly on the upper arm 109 in the direction of the arrow 111 the handle can be rocked about the point of engagement of the heel portion 107 thereof with the plate 108 to vertically lift the reservoir out of the ink well. The reservoir assembly can be further removed entirely from the machine by simply gripping the handles 106 with the hands and lifting. Thus, it is seen that removal of the complete inking equipment from the reservoir to and including the pen point can be accomplished without the requirement of any tools.

From the foregoing description, many objects and advantages of the invention will doubtless have come to the mind of the reader in addition to those which have been expressly recited, all of which have been achieved. It might be well at this point to mention a few of the advantages of rectilinear recorders. By the use of rectilinear recording, the trace obtained is a true representation of the signal input to the recorder. The area under a trace on a chart can be measured with a planimeter and the accuracy achieved can be as good as that of the planimeter and the person measuring the area, with no error in the chart itself. Where more than one record is to be obtained, such as for example in the case of a multichannel operation, the time axes for the channels will register. Finally, where the recorder is used in a group of instruments, while not all can be curvilinear, all can be rectilinear and this is desirable to avoid confusion and assure uniformity.

It should nevertheless be understood that the novel structure disclosed herein or the galvanometer structure can be easily modified to produce non-linear mathematical relationships between input signal and pen deflection. For example, the lever arm and drum and pulley relationship can be altered to still provide a straight line across (transverse) the chart but allow a non-linear relationship between the galvanometer rotational angle and the pen deflection. Similarly, the galvanometer magnetic structure may be altered to give a non-linear relationship between the current input and its angular rotation. Accordingly, modification can be made to produce non-linear mathematical relationships between input signal and pen deflection such as logarithmic, square law, or other functions.

Comparison of the present invention with rectilinear machines which have been proposed heretofore immediately reveals substantial advantages of the present invention. Included among these are the fact that the construction is extremely simple, straight-forward, and the recorder is easily maintained. There is no requirement of jeweler's tools or magnifying glasses in the maintenance of the instrument, and the mechanism is statically balanced so that tipping sideways or fore and aft will not move the pen point.

It should, of course, be recognized that the novel motion translating means of the present invention is not only applicable with ink writing pens but also with other types of marking devices.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. Motion translating means comprising:
a first stationary member having a surface which is cylindrical with respect to a first axis;
a driving arm rotatable on said first axis;
a second member having a surface which is cylindrical with respect to a second axis parallel to said first axis,
said second member being rotatably mounted to said arm for rotation thereon;
a belt engaging the cylindrical surfaces of both of said members whereby said second member is positively rotated upon said arm when said arm is rotated on said first axis;

attachment means secured to said members and including tabs secured to said belt only at points spaced radially outward from said cylindrical surface to prevent slipping of said belt on said surfaces, at least one of said attachment means being adjustable on the member to which it is secured, to facilitate tightening of said belt.

2. Motion translating means comprising:
a first stationary member having a surface which is cylindrical with respect to a first axis, and having a second surface;
a driving arm rotatable on said first axis;
a second member having a surface which is cylindrical with respect to a second axis parallel to said first axis,
said second member being rotatably mounted to said arm for rotation thereon;
a tab member having a first portion secured to the said second surface of said stationary member and having a second portion angularly disposed with respect to said first portion and extending parallel to a plane tangent to said cylindrical surface of said stationary member and in radially spaced relationship to said cylindrical surface of said stationary member;
a belt engaging the cylindrical surfaces of both of said members having cylindrical surfaces, with one end of said belt being secured to the second portion of said tab member and in radially spaced relationship to said cylindrical surface of said stationary member;
anchor means secured to said stationary member and fastened to the other end of said belt,
the said tab member holding said belt in engagement with the cylindrical surfaces of said first and second members and the radial spacing avoiding excessive loading of said belt.

3. The motion translating means of claim 2 wherein:
said tab member is pivotable on said stationary member and fixable in various pivoted positions, thereby accommodating adjustment of tension in said belt.

4. Motion translating means comprising:
a first stationary member having a surface which is cylindrical with respect to a first axis and having a second surface;
a driving arm rotatable on said first axis;
a second member having a surface which is cylindrical with respect to a second axis parallel to said first axis,
said second member being rotatably mounted to said arm for rotation thereon;
a first tab member having a first portion secured to the said second surface of said stationary member and having a second portion angularly disposed with respect to said first portion and extending parallel to a plane tangent to said cylindrical surface of said stationary member and in radially spaced relationship to said cylindrical surface of said stationary member;
a second tab member having a first portion secured to the first portion of said first tab member and having a second portion disposed in parallel spaced relationship to a plane tangent the said cylindrical surface of said stationary member, the said second portion of said second tab member being disposed in radially spaced relationship to said cylindrical surface of said stationary member, the spacing between the said second portion of said first tab member and said first axis being less than the spacing between the said second portion of said second tab member and said first axis;
and a belt engaging the cylindrical surfaces of both of said members having cylindrical surfaces, with one end of said belt being secured to the said second portion of said first tab member and the other end of said belt being secured to the said second portion of said second tab member, the said tab members holding said belt in engagement with the cylindrical surfaces of said first and second members having cylindrical surfaces.

5. A motion translating means as set forth in claim 4 wherein:
said second tab member has a slot in said first portion thereof;
and a screw extends through said slot and is threadedly received in said stationary member, a portion of said screw bearing on said second tab member to secure said second tab member to said stationary member,
said second tab member being movable on said stationary member upon loosening of said screw to adjust said belt.

6. A recorder comprising:
a frame;
a galvanometer mounted on said frame and having an output shaft;
means in said frame to support a medium for receiving a mark;
a first member secured to said frame and having a surface which is cylindrical with respect to a first axis;
a crank arm secured to said galvanometer shaft;
an elongated driving arm mounted on said galvanometer shaft and having a slot therein, said driving arm being rotatable with respect to said crank arm about said shaft;
a fastener passing through said slot and securing said driving arm to said crank arm, said slot extending generally transverse to the longest dimension of said driving arm and along an arc having a center of curvature at said shaft and accommodating adjustment of said driving arm rotationally with respect to said crank arm when said fastener is loosened;
a second member having a surface which is cylindrical with respect to a second axis parallel to said first axis,
said second member being rotatably mounted to said driving arm for rotation thereon;
and a belt engaging the cylindrical surfaces of both of said members and secured to said members to avoid sliding of said belt on said surfaces,
whereby said second member is positively rotated upon said driving arm when said driving arm is rotated by said galvanometer shaft.

7. A recorder comprising:
a frame;
a galvanometer mounted on said frame and having an output shaft;
means in said frame to support a medium for receiving a mark;
a first member mounted to said frame and having a surface which is cylindrical with respect to a first axis, said first member having a circular surface thereon fittingly received by a mating circular surface on said frame, both of said circular surfaces having a common axis colinear with said first axis, whereby said first member is adjustable on said frame about said axis, and fastener means on said member to secure said member to said frame;
a driving arm secured to said galvanometer shaft;
a second member having a surface which is cylindrical with respect to a second axis parallel to said first axis,
said second member being rotatably mounted to said arm for rotation thereon;
a belt engaging the cylindrical surfaces of both of said members and secured to said members to avoid sliding of said belt on said surfaces,
whereby said second member is positively rotated upon said arm when said arm is rotated by said galvanometer shaft;
and a writing unit secured to said second member and having a marking element at a substantial distance from said axis, said element being thereby movable rectilinearly by said galvanometer.

8. A recorder comprising:

a frame;

a galvanometer mounted on said frame and having an output shaft;

a record chart medium;

means on said frame to support said chart medium;

a first member secured to said frame and having a surface which is cylindrical with respect to a first axis;

a driving arm secured to said galvanometer shaft;

a second member having a surface which is cylindrical with respect to a second axis parallel to said first axis, said second member being rotatably mounted to said arm for rotation thereon;

a belt engaging the cylindrical surfaces of both of said members, whereby said second member is rotated upon said arm when said arm is rotated on said first axis, a writing unit mounted on said second member and including a pen fork secured to said second member and having a pair of horizontally spaced upstanding notched supports, a pen having a horizontal knife edge supported in the notches of said pen fork, and having a pen arm extending from said knife edge, and having a pen point on said pen arm;

said pen arm having an ink passageway therein communicating between an inlet and said point;

and ink supply means including a reservoir supported in said frame, handle means connected to said reservoir to facilitate removal thereof from said frame, a cover on said reservoir, a riser tube secured to said cover and extending therethrough, and a flexible tube connecting said riser tube to said inlet, said pen and ink supply means being thereby readily removable from said recorder.

9. A recorder as set forth in claim 8 wherein:

said reservoir is received in a well in said frame;

said handle means includes a lever pivotally fastened to each end of said reservoir, said levers having heel portions resting on said frame and pivotal thereon, and said levers having arms thereon with the heel portions being located between the arms and the points of pivotal fastening to said reservoir.

whereby said levers are rockable on said heel portions by pushing down on distal portions of said arms to lift said reservoir from said well upon depression of said arms, said arms being detached from said frame whereby said levers and said reservoir are removable unitarily from said frame.

References Cited by the Examiner

UNITED STATES PATENTS

| 1,599,268 | 9/26 | Augus | 346—140 |
| 2,093,254 | 9/37 | Spitzglass et al. | 235—61 |
| 2,594,136 | 4/52 | De Maggio. | |
| 2,635,419 | 4/53 | Ambrose et al. | 74—96 |
| 2,669,501 | 2/54 | Young et al. | 346—140 X |
| 2,932,776 | 4/60 | Massa. | |
| 2,942,927 | 6/60 | Keyser | 346—17 |
| 2,950,164 | 8/60 | Albright | 346—140 |
| 2,985,728 | 5/61 | Macune | 74—10.7 X |
| 3,012,443 | 12/61 | Ljungstrom | 74—95 X |
| 3,088,788 | 5/63 | Brown et al. | 346—117 X |

FOREIGN PATENTS 74,542   5/54   Netherlands.

LEO SMILOW, *Primary Examiner.*